(12) United States Patent
Dormody et al.

(10) Patent No.: US 12,130,155 B2
(45) Date of Patent: *Oct. 29, 2024

(54) SYSTEMS AND METHODS FOR DETERMINING CALIBRATION VALUES FOR ATMOSPHERIC SENSORS THAT PROVIDE MEASURED PRESSURES USED FOR ESTIMATING ALTITUDES OF MOBILE DEVICES

(71) Applicant: NextNav, LLC, Sunnyvale, CA (US)

(72) Inventors: Michael Dormody, San Jose, CA (US); Guiyuan Han, San Jose, CA (US); Badrinath Nagarajan, Cupertino, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,199

(22) Filed: Apr. 28, 2023

(65) Prior Publication Data

US 2023/0266121 A1 Aug. 24, 2023

Related U.S. Application Data

(63) Continuation of application No. 17/248,913, filed on Feb. 12, 2021, now Pat. No. 11,674,798, which is a
(Continued)

(51) Int. Cl.
*G01C 5/00* (2006.01)
*G01C 5/06* (2006.01)
(Continued)

(52) U.S. Cl.
CPC .............. *G01C 5/06* (2013.01); *G01L 27/005* (2013.01); *H04W 4/029* (2018.02)

(58) Field of Classification Search
CPC .......... G01C 5/06; G01C 5/005; G01C 25/00; G01C 21/20; G01C 21/206; G01C 25/005;
(Continued)

(56) References Cited

U.S. PATENT DOCUMENTS 6,735,542 B1 5/2004 Burgett et al.
6,970,795 B1 11/2005 Burgett et al.
(Continued)

OTHER PUBLICATIONS

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.
(Continued)

*Primary Examiner* — Andre J Allen
(74) *Attorney, Agent, or Firm* — MLO, a professional corp.

(57) ABSTRACT

Determining calibration values for atmospheric sensors that provide measured pressures used for estimating altitudes of mobile devices. Particular systems and methods determine if any uncalibrated reference-level pressure estimates associated with an unstable pressure sensor should not be used when calibrating the unstable pressure sensor, and calibrate the unstable pressure sensor using all of the uncalibrated reference-level pressure estimates except any uncalibrated reference-level pressure estimate that should not be used when calibrating the unstable pressure sensor.

15 Claims, 11 Drawing Sheets

Related U.S. Application Data continuation of application No. 16/380,107, filed on Apr. 10, 2019, now Pat. No. 10,921,121.

(60) Provisional application No. 62/679,937, filed on Jun. 3, 2018.

(51) Int. Cl.
*G01L 27/00* (2006.01)
*H04W 4/029* (2018.01)

(58) Field of Classification Search
CPC ...... G01C 15/002; G01C 15/06; G01C 15/10; G01C 17/30; G01C 21/00; G01C 21/005; G01C 21/04; G01C 21/16; G01C 21/165; G01C 21/26; G01C 21/265; G01C 22/006; G01L 11/002; G01L 9/0054; G01L 19/083; G01L 11/02; G01L 19/0092; G01L 19/08; G01L 19/10; G01L 19/16; G01L 9/0019; G01L 19/0084; G01L 21/14; G01L 7/182; G01L 7/187; G01L 9/0008; G01L 9/0042; G01L 9/0048; G01L 9/008; G01L 19/003; G01L 19/0038; G01L 19/04; G01L 19/0654; G01L 19/14; G01L 19/142; G01L 19/143; G01L 19/147; G01L 7/00; G01L 7/02; G01L 7/06; G01L 7/104; G01L 7/22; G01L 9/001; G01L 9/0039; G01L 9/005; G01L 9/0052; G01L 9/0082; G01L 9/0088; G01L 9/065; G01L 9/085
USPC ......................................................... 73/384
See application file for complete search history.

(56) References Cited

U.S. PATENT DOCUMENTS

| | | | |
|---|---|---|---|
| 8,130,141 B2 | 3/2012 | Pattabiraman et al. | |
| 9,057,606 B2 | 6/2015 | Wolf et al. | |
| 9,980,246 B2 | 5/2018 | Pattabiraman et al. | |
| 10,514,258 B2 | 12/2019 | Dormody et al. | |
| 10,704,905 B2 | 7/2020 | Dormody et al. | |
| 11,674,798 B2* | 6/2023 | Dormody | G01L 27/005 73/384 |
| 2015/0127287 A1 | 5/2015 | Wolf et al. | |
| 2015/0247917 A1 | 9/2015 | Gum et al. | |
| 2016/0245716 A1 | 8/2016 | Gum et al. | |
| 2017/0023430 A1 | 1/2017 | Dormody et al. | |
| 2017/0280301 A1 | 9/2017 | Chang et al. | |
| 2017/0363423 A1 | 12/2017 | Dormody et al. | |
| 2020/0072606 A1 | 3/2020 | Nagarajan et al. | |
| 2020/0116483 A1 | 4/2020 | Dormody et al. | |

OTHER PUBLICATIONS

Ghaderi et al., "Deep Forecast: Deep Learning-based Spatio-Temporal Forecasting", ICML 2017 Time Series Workshop, Sydney, Australia, 2017, 6 pages.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

Notice of Allowance and Fees dated Feb. 10, 2023 for U.S. Appl. No. 17/248,913.

Notice of Allowance dated Sep. 29, 2020 for U.S. Patent application No. 16/380, 107.

Office Action dated Sep. 22, 2022 for U.S. Appl. No. 17/248,913.

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

\* cited by examiner

SYSTEMS AND METHODS FOR DETERMINING CALIBRATION VALUES FOR ATMOSPHERIC SENSORS THAT PROVIDE MEASURED PRESSURES USED FOR ESTIMATING ALTITUDES OF MOBILE DEVICES

RELATED APPLICATIONS

This application is a continuation of U.S. patent application Ser. No. 17/248,913, filed Feb. 12, 2021, which is a continuation of U.S. patent application Ser. No. 16/380,107, filed Apr. 10, 2019, which claims priority to U.S. Provisional Patent Application No. 62/679,937, filed Jun. 3, 2018, all of which are hereby incorporated by reference herein in their entirety.

TECHNICAL FIELD

Aspects of this disclosure generally pertain to positioning of mobile devices.

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based positioning system, altitude can be computed using a measurement of pressure from a calibrated pressure sensor of a mobile device along with ambient pressure measurement(s) from a network of calibrated reference pressure sensors and a measurement of ambient temperature from the network or other source. An estimate of an altitude of a mobile device ($h_{mobile}$) can be computed by the mobile device, a server, or another machine that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an estimate of pressure at the location of a reference pressure sensor that is accurate to within a tolerated amount of pressure from true pressure (e.g., less than 5 Pa), $T_{remote}$ is an estimate of temperature (e.g., in Kelvin) at the location of the reference pressure sensor or a different location of a remote temperature sensor, $h_{sensor}$ is an estimated altitude of the reference pressure sensor that is estimated to within a desired amount of altitude error (e.g., less than 1.0 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor can be converted to an estimated reference-level pressure that corresponds to the reference pressure sensor in that it specifies an estimate of pressure at the latitude and longitude of the reference pressure sensor, but at a reference-level altitude that likely differs from the altitude of the reference pressure sensor. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor, $P_{ref}$ is the reference-level pressure estimate, and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The accuracy of the estimated altitude depends on the accuracy of each measured pressure, $P_{sensor}$, from each atmospheric sensor. Unfortunately, each atmospheric sensor is unstable and susceptible to drift over time. Drift is a phenomenon whereby the unstable sensor's measurements of pressure deviate from the true values of pressure over time. Low amounts of drift can be tolerated when a floor-level accuracy is required for estimated altitudes. However, drift will often reach amounts that cannot be tolerated. Thus, each unstable atmospheric sensor must be calibrated to account for drift on a regular basis.

Some approaches for calibrating an unstable atmospheric sensor compare reference-level pressure estimates of the unstable atmospheric sensor with reference-level pressure estimates of a stable atmospheric sensor over time, and determine how to calibrate the unstable atmospheric sensor based on the comparison. For example, one approach for calibrating an unstable atmospheric sensor assumes that differences between reference-level pressure estimates of the unstable atmospheric sensor and reference-level pressure estimates of a stable atmospheric sensor over time are caused by drift, and those differences can be used as a calibration value that is applied to future reference-level pressure estimates of the unstable atmospheric sensor to account for drift. Occasionally, drift is not the only cause for the difference between a reference-level pressure estimate of the unstable atmospheric sensor and a reference-level pressure estimate of the stable atmospheric sensor. For example, occasional localized pressure difference anomalies from instrument failure of the unstable atmospheric sensor, severe weather patterns in an area around the unstable atmospheric sensor that create large pressure gradients between the reference sensor and the unstable sensor, the time of day (e.g., midday heating in the area around the atmospheric sensor), or other localized circumstances can produce reference-level pressure estimates that should not be used when calibrating the unstable atmospheric sensor. Systems and methods are needed to identify when localized anomalies are influencing reference-level pressure estimates of an unstable atmospheric sensor so those reference-level pressure estimates can be excluded from consideration when the unstable atmospheric sensor is calibrated.

DETAILED DESCRIPTION

Figure 1:
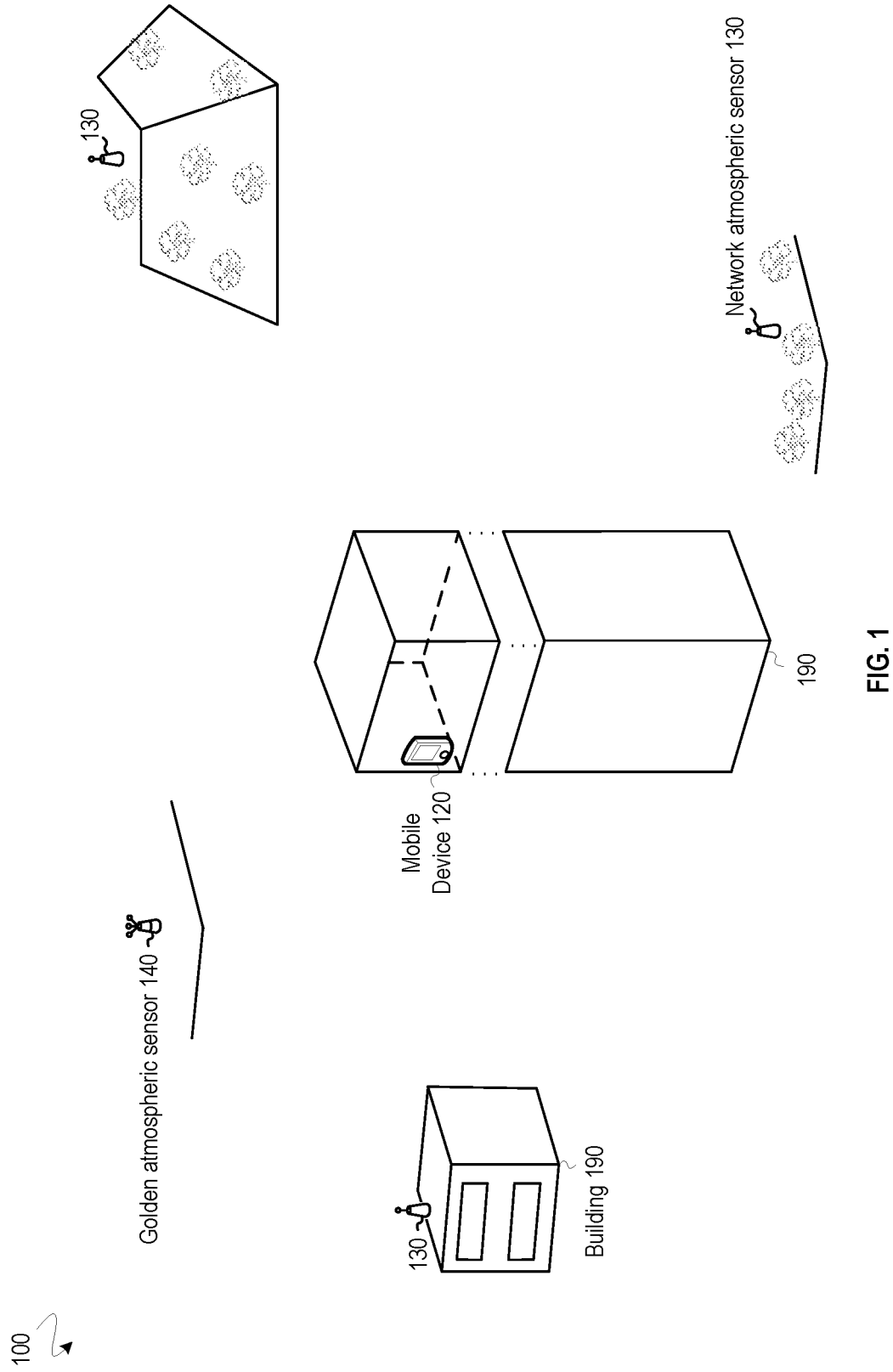
FIG. 1 depicts an operational environment in which atmospheric sensors that provide measured pressures used for estimating altitudes of mobile devices are calibrated.

Approaches for determining calibration values for atmospheric sensors that provide measured pressures used for estimating altitudes of mobile devices are described herein. Attention is initially drawn to FIG. 1, which depicts an environment 100 in which an altitude of a mobile device 120 is estimated using a measured pressure at the position of the mobile device 120 and measured pressures from unstable atmospheric sensors 130 (e.g., weather stations) at different known altitudes in a network of such sensors.

One common approach for estimating the altitude of the mobile device 120 uses Equation 1 (and optionally Equation 2) described in the Background section of this disclosure. By way of example, each unstable atmospheric sensor 130 transmits pressure data (e.g., reference-level pressures computed by the atmospheric sensor, or measured pressures if reference-level pressures are computed at the mobile device 120, a server, or elsewhere). The pressure data is received by the mobile device 120 and/or a server for use in determining an estimated altitude of the mobile device 120. Transmission from a particular unstable atmospheric sensor 130 may be made by any known means, including (i) transmission via a transmitter (not shown) that includes or is co-located with the atmospheric sensor 130, or (ii) any suitable technique for transmitting data from the atmospheric sensor 130 to another thing (e.g., a mobile device or a server).

The accuracy of the estimated altitude depends on the accuracy of the measured pressures from the unstable atmospheric sensors 130, which can be affected by measurement errors due to drift of the unstable atmospheric sensors 130 over time. Thus, each of the unstable atmospheric sensors 130 must be calibrated to account for drift of that unstable atmospheric sensor 130. One approach used to calibrate an unstable atmospheric sensor 130 involves (i) converting measurements of pressure of the unstable atmospheric sensor 130 to a reference-level pressure estimate for a reference-level altitude (e.g., using Equation 2 described previously), (ii) converting measurements of pressure of a stable (i.e., "golden") atmospheric sensor 140 to a reference-level pressure estimate for the reference-level altitude (e.g., using Equation 2 described previously), (iii) determining a time-averaged difference of the reference-level pressure estimates of the unstable atmospheric sensor 130 and the reference-level pressure estimates of the stable atmospheric sensor 140, and (iv) using the time-averaged difference as a calibration value to adjust future measurements of pressure from the unstable atmospheric sensor 130 or a corresponding reference-level pressure estimates determined from the measurements of pressure.

Figure 2A:
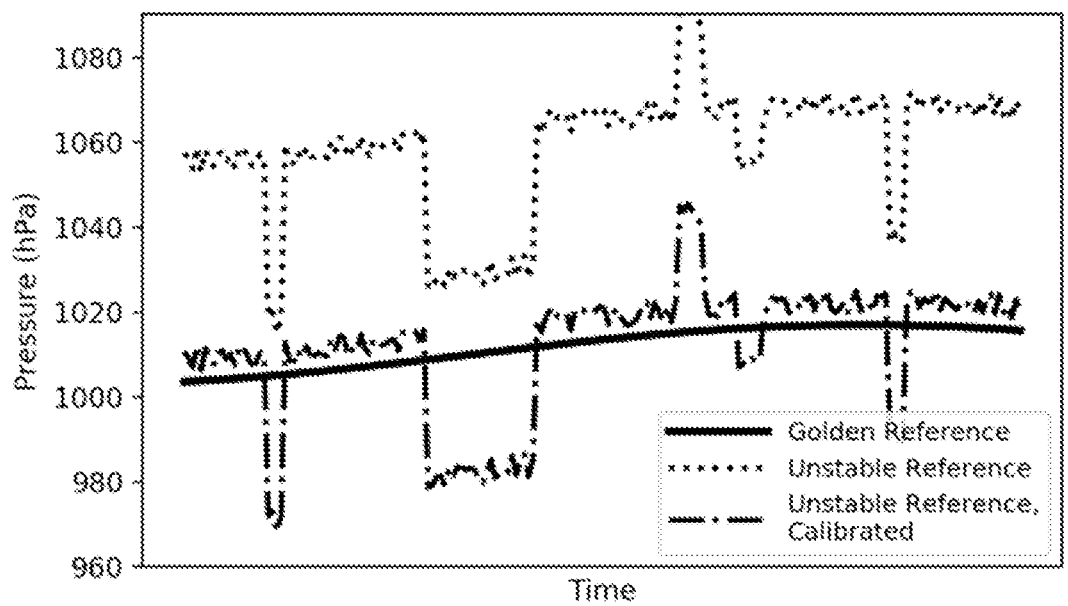
FIG. 2A and FIG. 2B illustrate consequences of using pressure measurements of an unstable atmospheric sensor that are affected by localized circumstances when calibrating the unstable atmospheric sensor.
Figure 2B:
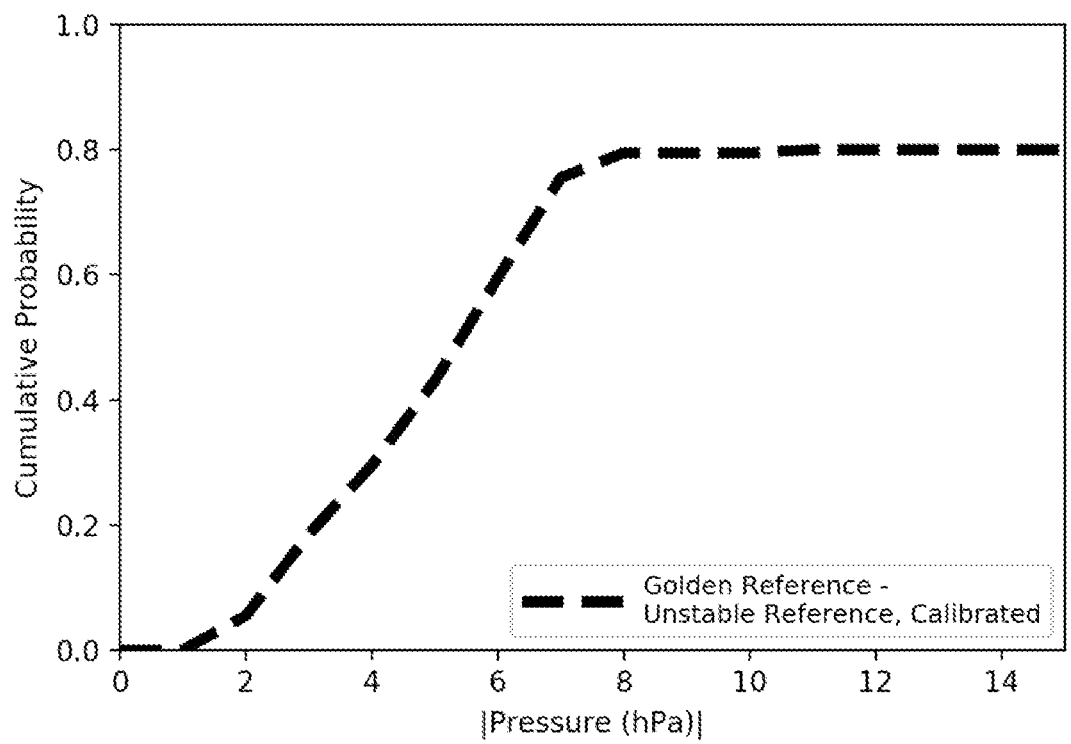
Figure 3A:
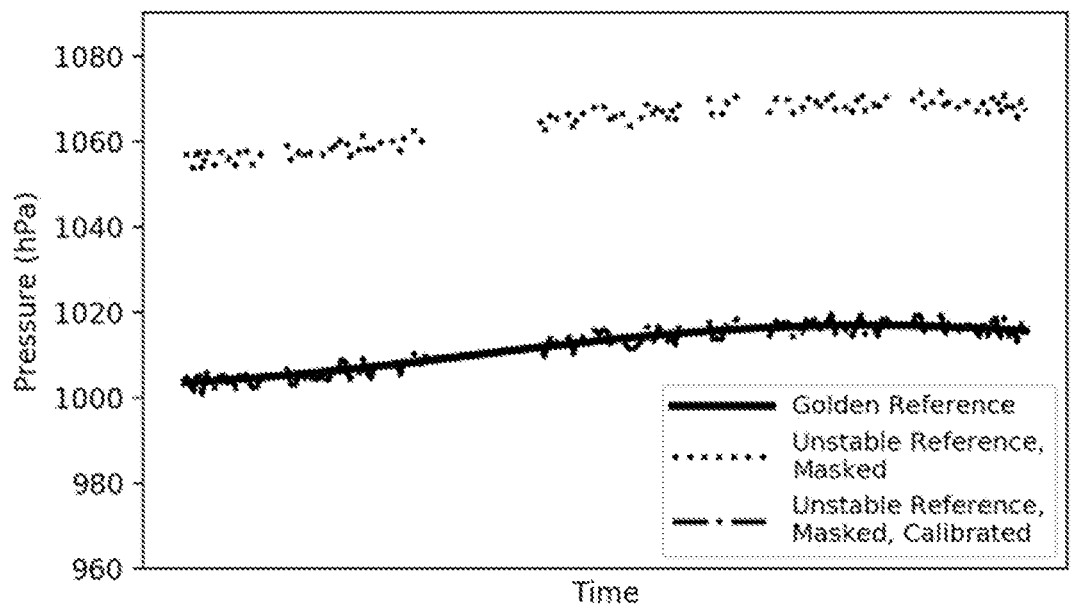
FIG. 3A and FIG. 3B illustrate benefits of detecting pressure measurements of an unstable atmospheric sensor that are affected by localized circumstances when calibrating the unstable atmospheric sensor.
Figure 3B:
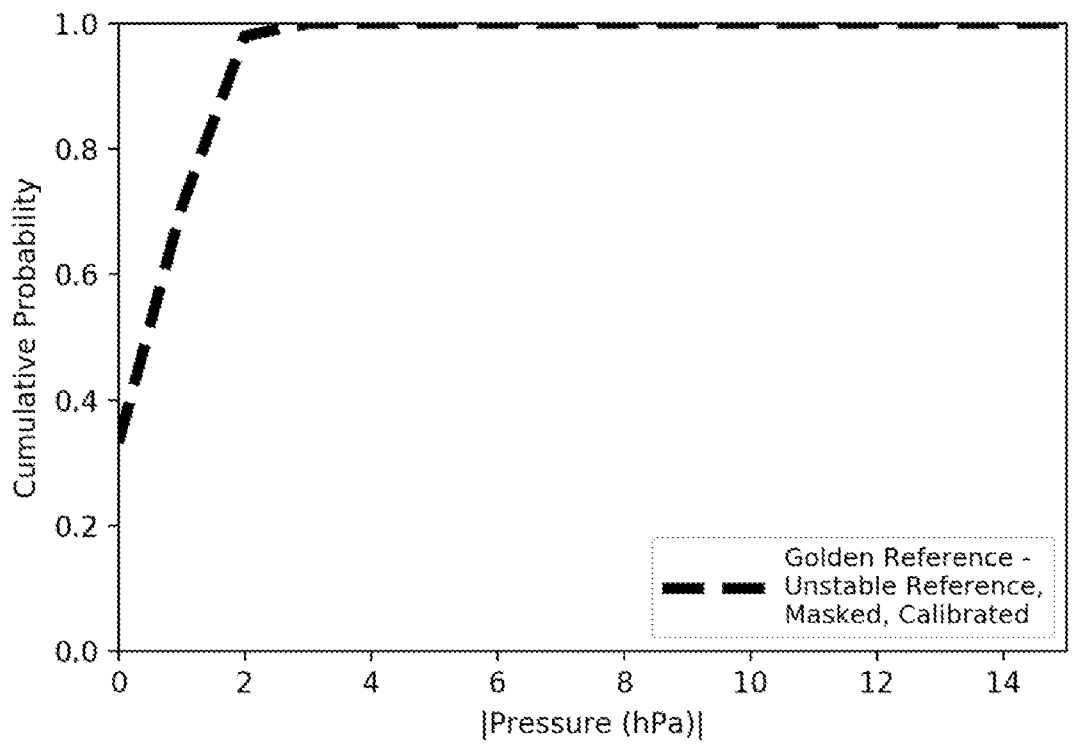

Unfortunately, not all measurements of pressure from the unstable atmospheric sensor 130 can be used to determine a calibration value for the unstable atmospheric sensor 130. Occasionally, technical issues with the unstable atmospheric sensor 130 other than drift, severe weather patterns in an area around the unstable atmospheric sensor 130, the time of day (e.g., midday heating in the area around the unstable atmospheric sensor 130), or other localized circumstances can produce measurements of pressure that should not be used when calibrating the unstable atmospheric sensor 130, since such circumstances do not affect the measurements of pressure from the stable atmospheric sensor 140, or such phenomena are transient and do not affect the long-term average measurement. By way of example, FIG. 2A and FIG. 2B illustrate consequences of using pressure measurements that are affected by localized circumstances when calibrating the unstable atmospheric sensor 130. In contrast, FIG. 3A and FIG. 3B illustrate benefits of detecting pressure measurements that are affected by localized circumstances, and excluding them from consideration when calibrating the unstable atmospheric sensor 130. As shown in FIG. 2A, the reference-level pressure estimates of the unstable atmospheric sensor 130 include changes in pressure over time that do not align with the reference-level pressure estimates of the stable ("Golden") atmospheric sensor 140. As shown in FIG. 2B, a predefined percentage such as 50% or more of the differences between accurate reference-level pressure estimates for the stable atmospheric sensor 140 and calibrated reference-level pressure estimates for the unstable atmospheric sensor 130 (i.e., reference-level pressure estimates adjusted by a calibration value determined using the pressure values shown in FIG. 2A) are nearly 6 Pa, which does not meet a typical threshold difference such as 2 Pa or less. As shown in FIG. 3A, the reference-level pressure estimates of the unstable atmospheric sensor 130 exclude the changes in pressure over time that do not align with the reference-level pressure estimates of the stable atmospheric sensor 140. As shown in FIG. 3B, the predefined percentage such as 50% or more of the differences between accurate reference-level pressure estimates for the stable atmospheric sensor 140 and calibrated reference-level pressure estimates for the unstable atmospheric sensor 130 (i.e., reference-level pressure estimates adjusted by a calibration value determined using the pressure values shown in FIG. 3A) are less than 2 Pa, which meets the typical threshold difference such as 2 Pa or less.

One of ordinary skill in the art will appreciate that systems and methods are needed to identify unusable pressure values (e.g., measurements of pressure or corresponding reference-level pressure estimates) of an unstable atmospheric sensor 130 so those pressure values can be excluded from consideration when the unstable atmospheric sensor 130 is calibrated. In one system and method, a stable atmospheric reference sensor is used to measure pressure and temperature over a time period T, and the measured pressures are converted to reference-level (e.g., sea-level) pressures using the measured pressure, the measured temperature, the known altitude of the stable atmospheric reference sensor, and Equation 2 described earlier in this disclosure. Similarly, an unstable atmospheric reference sensor is used to measure pressure and temperature over the time period T, and the measured pressures are converted to reference-level pressure estimates using the measured pressure, the measured temperature, the known altitude of the unstable atmospheric reference sensor, and Equation 2. In one embodiment, unusable reference-level pressure estimates (or the pressure measurements used to determine those reference-level pressure estimates) that correspond to the unstable atmospheric sensor can be manually identified and excluded (e.g., from a technician field report or a weather report) before remaining reference-level pressure estimates are used to determine a calibration value that can be used to "calibrate" the unstable atmospheric sensor (e.g., used to adjust pressure values for the unstable atmospheric sensor). In another embodiment, unusable reference-level pressure estimates (or the pressure measurements used to determine those reference-level pressure estimates) that correspond to the unstable atmospheric sensor can be automatically identified and excluded before remaining reference-level pressure estimates are used to determine a calibration value that can be used to "calibrate" the unstable atmospheric sensor. During one embodiment of an automatic approach, a cumulative distribution function (CDF) of the time-aligned difference between corresponding pressure values (e.g., reference-level pressure estimates) of the stable atmospheric sensor and the unstable atmospheric sensor is determined (e.g., where the distribution represents the absolute value of the difference). A value of the CDF for a predefined percentage (e.g., 50%) is determined, and that value is compared to a threshold pressure value (e.g., 2 Pa). If the value is less than the threshold pressure value, a determination is made that all of the pressure values (e.g., the reference-level pressure estimates) of the unstable atmospheric sensor can be considered when the unstable atmospheric sensor is calibrated (e.g., when determining a calibration value). If the value is not less than the threshold pressure value, a determination is made that some of the pressure values of the unstable atmospheric sensor cannot be considered when the unstable atmospheric sensor is calibrated, and an outlier rejection process is started to identify unusable pressure values. Different outlier rejection processes can be used, including measuring the difference between each pressure value against the median of neighboring pressure values (e.g., n pressure value(s) before and n pressure value(s) after the pressure value), and designating the pressure value as unusable if the difference exceeds a threshold amount of pressure. The advantage of such a process is that it can detect features with sharp, sudden peaks. An alternative process that uses median/mean subtracted difference data can help identify features that may not necessarily have sharp changes and instead have more gradual changes. After unusable pressure values are determined, the remaining usable pressure values are used to compute a calibration value for the unstable atmospheric sensor.

Figure 4:
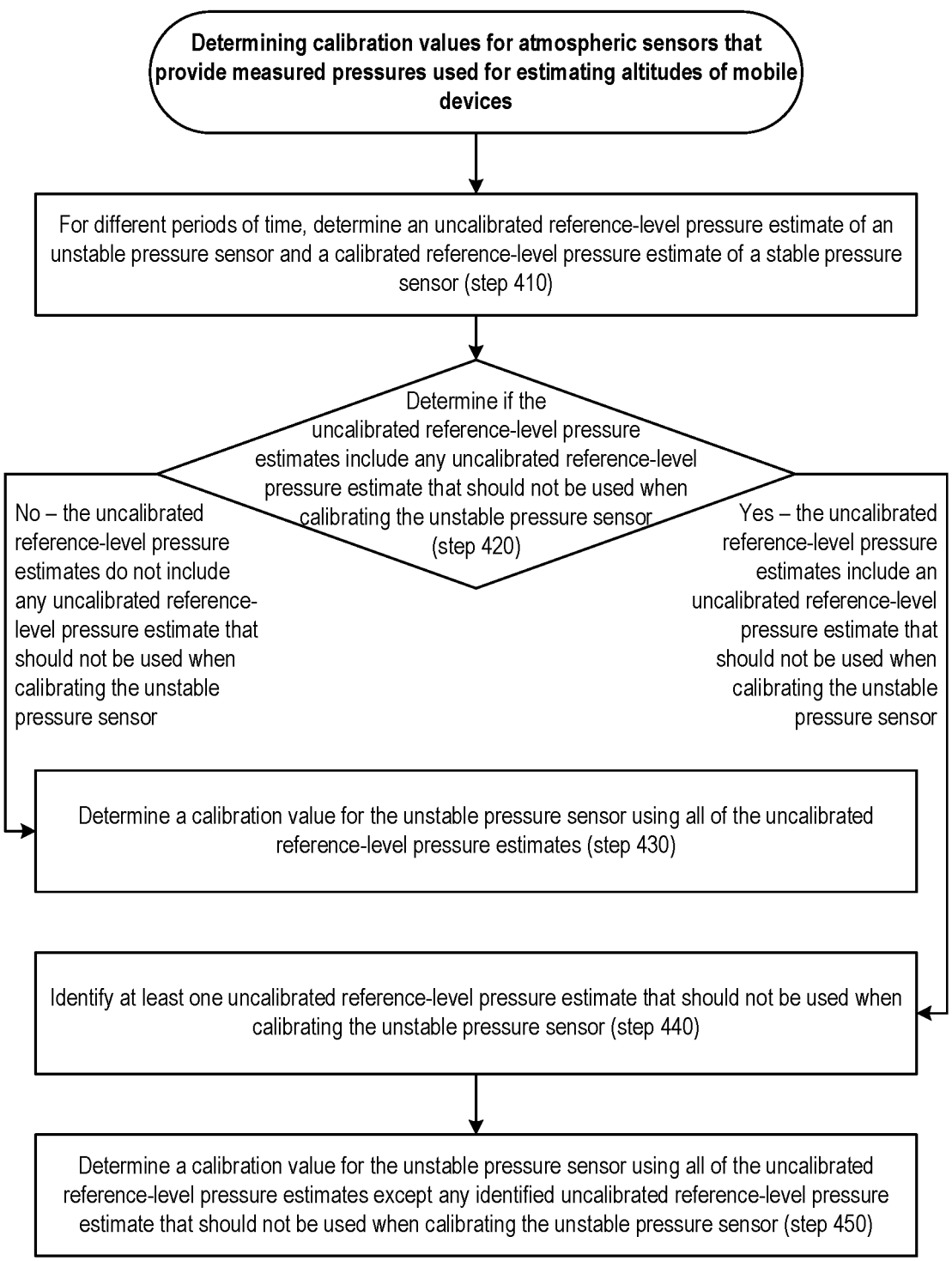
FIG. 4 depicts a process for determining calibration values for atmospheric sensors that provide measured pressures used for estimating altitudes of mobile devices.

FIG. 4 depicts a process for determining calibration values for atmospheric sensors that provide measured pressures used for estimating altitudes of mobile devices.

Initially, for each period of time from different periods of time, an uncalibrated reference-level pressure estimate of an unstable pressure sensor and a calibrated reference-level pressure estimate associated with a stable pressure sensor are determined (step 410). The uncalibrated reference-level pressure estimate of the unstable pressure sensor is based on an uncalibrated pressure measurement that was measured by an unstable pressure sensor during the period of time, and the calibrated reference-level pressure estimate of the stable pressure sensor is based on a calibrated pressure measurement that was measured by the stable pressure sensor during the period of time. One example of determining a reference-level pressure estimate for a reference altitude includes receiving the reference-level pressure estimate from the pressure sensor at a server, where the reference-level pressure estimate was generated at the pressure sensor using previously-described Equation 2. By way of example, an "uncalibrated" pressure measurement may include a measurement of pressure from a pressure sensor that has not been adjusted to account for drift. The period of time can be any amount of time that is long enough for the unstable pressure sensor and the stable pressure sensor to generate their corresponding pressure measurements under similar environmental pressure conditions, which may or may not occur at exactly the same time. Ideally, the pressure measurements would be generated at the same time, but the period of time could depend on the time of day or current weather pattern in an environment such that the period of time can range from a few mins (e.g., for diurnal pressure variation of a hot afternoon), to tens of minutes (e.g., at night time when temperature does not have much influence in pressure patterns). If times do not align, then thresholds are adjustable to handle the increased uncertainty in the pressure measurement.

As the process advances, a determination is made as to whether the uncalibrated reference-level pressure estimates include any uncalibrated reference-level pressure estimate that should not be used when calibrating the unstable pressure sensor (step 420). In one embodiment, an uncalibrated reference-level pressure estimate that is not to be used is based on an uncalibrated pressure measurement affected by a localized anomaly that is not attributable to drift of the unstable pressure sensor. Examples of localized anomalies include anomalies attributable to technical issues with the unstable pressure sensor other than drift, severe weather patterns in an area around the unstable pressure sensor that are not in an area around the stable sensor, the time of day (e.g., midday heating in the area around the unstable pressure sensor that is not the same heating in an area around the stable sensor), or other localized circumstances can produce measurements of pressure that should not be used when calibrating the unstable pressure sensor. Examples of processes for determining if the uncalibrated reference-level pressure estimates include any uncalibrated reference-level pressure estimate that should not be used when calibrating the unstable pressure sensor during step 420 are provided in FIG. 5A and FIG. 5B, which are described later.

If, during step 420, a determination is made that the uncalibrated reference-level pressure estimates do not include any uncalibrated reference-level pressure estimate that should not be used when calibrating the unstable pressure sensor, a first calibration value for the unstable pressure sensor is determined using all of the uncalibrated reference-level pressure estimates (step 430). In one embodiment of step 430, determining the first calibration value includes the steps of: (a) for each of the periods of time, determine a difference between (i) the uncalibrated reference-level pressure estimate for the period of time and (ii) the calibrated reference-level pressure estimate for the period of time; and (b) compute the initial calibration value as an average, median or other combination of the differences (or a selected number of the differences).

If, during step 420, a determination is made that the uncalibrated reference-level pressure estimates include an uncalibrated reference-level pressure estimate that should not be used when calibrating the unstable pressure sensor, at least one uncalibrated reference-level pressure estimate that should not be used when calibrating the unstable pressure sensor is identified (step 440). In one embodiment, an outlier rejection algorithm is used to identify each of the uncalibrated reference-level pressure estimate(s) that are not to be used when calibrating the unstable pressure sensor. Examples of processes for identifying at least one uncalibrated reference-level pressure estimate that should not be used when calibrating the unstable pressure sensor during step 440 are provided in FIG. 6A and FIG. 6B, which are described later.

If at least one uncalibrated reference-level pressure estimate that should not be used when calibrating the unstable pressure sensor is identified during step 430, a second calibration value for the unstable pressure sensor is determined using all of the uncalibrated reference-level pressure estimates except any identified uncalibrated reference-level pressure estimate that should not be used when calibrating the unstable pressure sensor (step 450). In one embodiment of step 450, determining the second calibration value includes the steps of: (a) for each of the uncalibrated reference-level pressure estimates except any identified uncalibrated reference-level pressure estimate that should not be used when calibrating the unstable pressure sensor, determine a difference between (i) that uncalibrated reference-level pressure estimate and (ii) the calibrated reference-level pressure estimate for the same period of time; and (b) compute the initial calibration value as an average, median or other combination of the differences (or a selected number of the differences).

Determining if the uncalibrated reference-level pressure estimates include any uncalibrated reference-level pressure estimate that should not be used when calibrating the unstable pressure sensor (step 420)

Figure 5A:
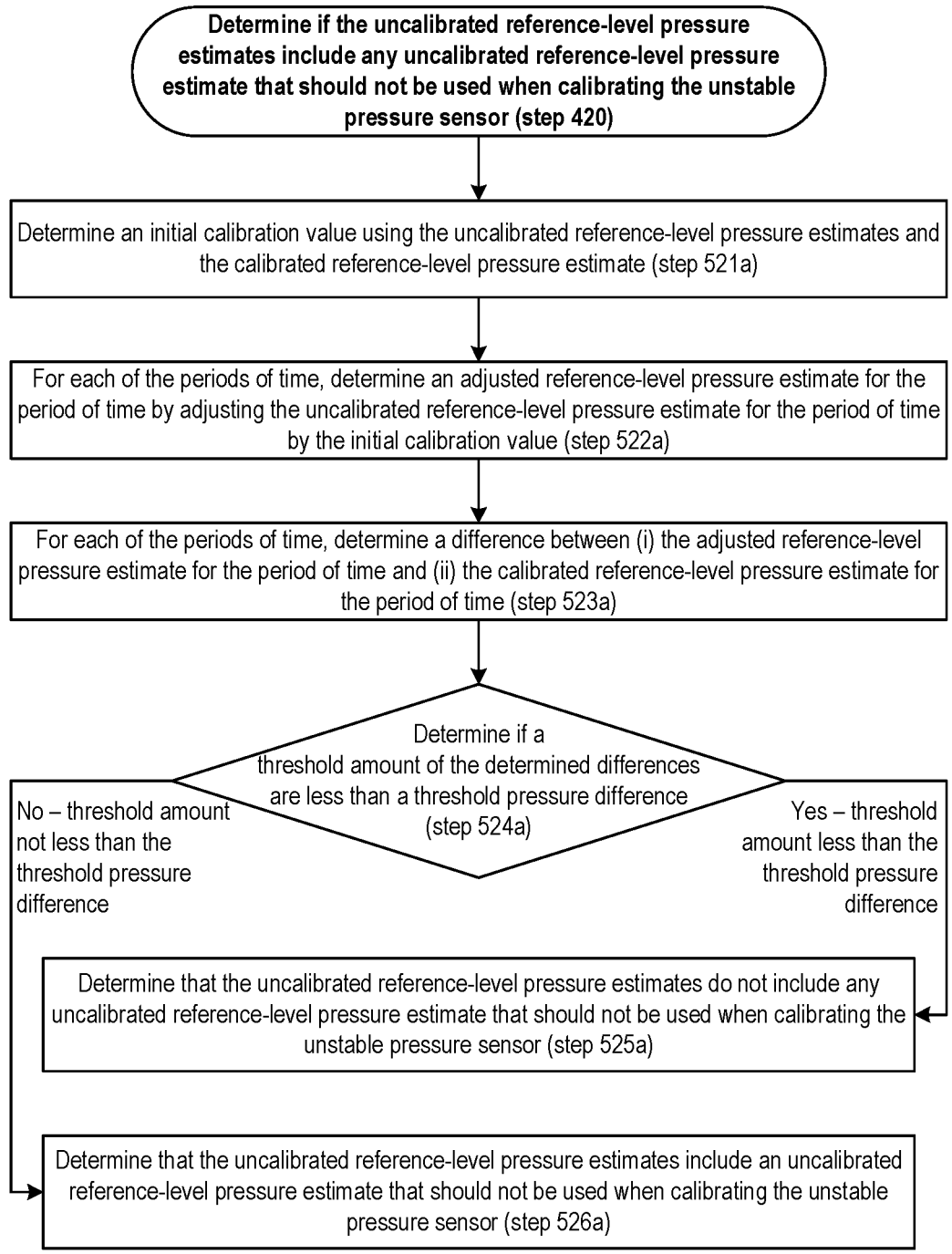
FIG. 5A and FIG. 5B depict different processes for determining if the uncalibrated reference-level pressure estimates include any uncalibrated reference-level pressure estimate that should not be used when calibrating the unstable pressure sensor.
Figure 5B:
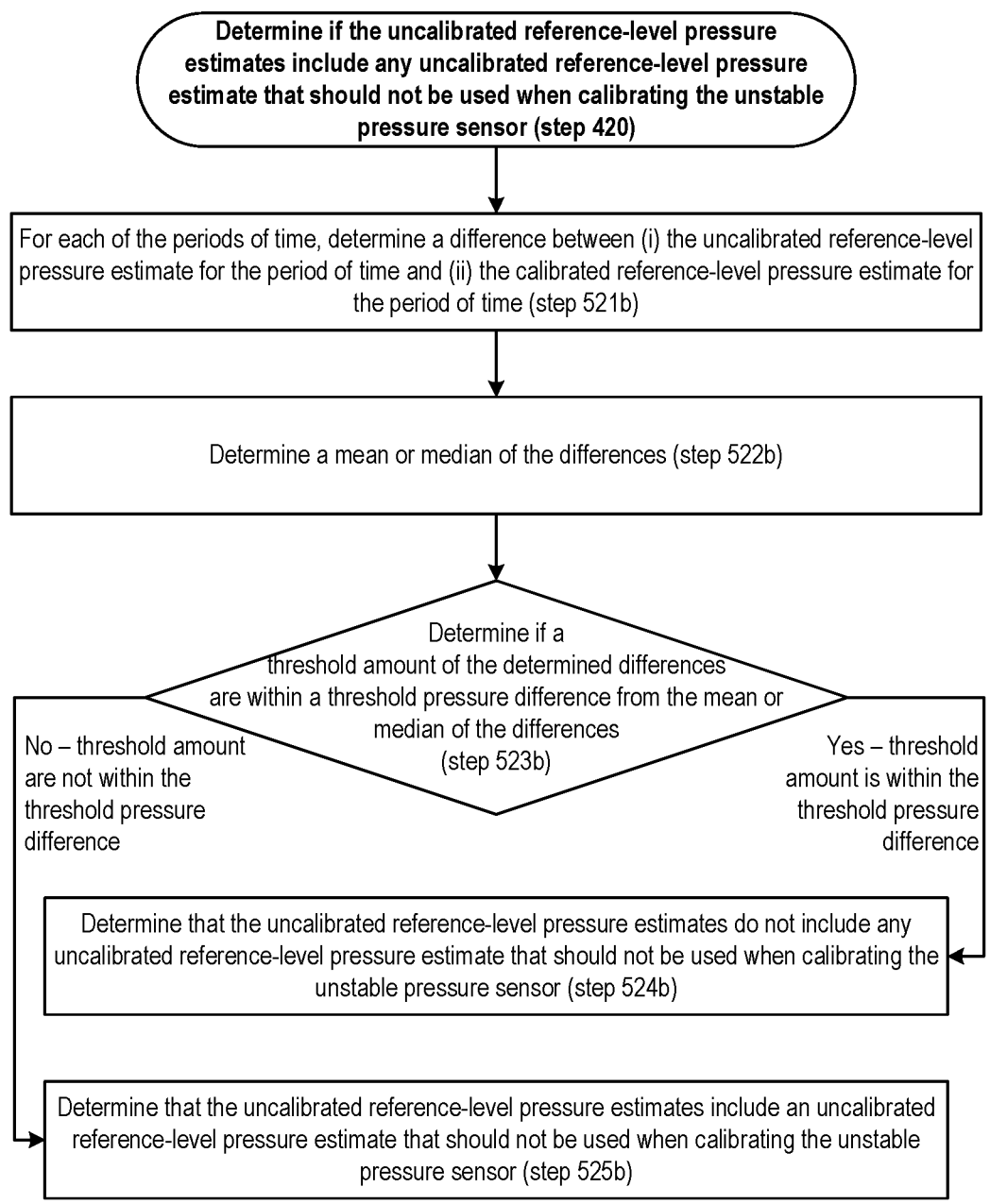

FIG. 5A and FIG. 5B depict different processes for determining if the uncalibrated reference-level pressure estimates include any uncalibrated reference-level pressure estimate that should not be used when calibrating the unstable pressure sensor.

A first example of a process for determining if the uncalibrated reference-level pressure estimates include any uncalibrated reference-level pressure estimate that should not be used when calibrating the unstable pressure sensor during step 420 is provided in FIG. 5A, which includes the steps of: determining an initial calibration value using the uncalibrated reference-level pressure estimates and the calibrated reference-level pressure estimate (step 521a); for each of the periods of time, determining an adjusted reference-level pressure estimate for the period of time by adjusting the uncalibrated reference-level pressure estimate for the period of time by the initial calibration value (step 522a); for each of the periods of time, determining a difference between (i) the adjusted reference-level pressure estimate for the period of time and (ii) the calibrated reference-level pressure estimate for the period of time (step 523a); determining if a threshold amount of the determined differences are less than a threshold pressure difference (step 524a); if the threshold amount of the determined differences are less than the threshold pressure difference, determining that the uncalibrated reference-level pressure estimates do not include any uncalibrated reference-level pressure estimate that should not be used when calibrating the unstable pressure sensor (step 525a); and if the threshold amount of the determined differences are not less than the threshold pressure difference, determining that the uncalibrated reference-level pressure estimates include an uncalibrated reference-level pressure estimate that should not be used when calibrating the unstable pressure sensor (step 526a).

By way of example, one embodiment of determining an initial calibration value during step 521a includes the steps of: (a) for each of the periods of time, determine a difference between (i) the uncalibrated reference-level pressure estimate for the period of time and (ii) the calibrated reference-level pressure estimate for the period of time; and (b) computing the initial calibration value as an average, median or other combination of the differences (or a selected number of the differences).

By way of example, the threshold amount of step 524a may be 50% or 80%, and the threshold pressure difference of step 524a may be 2 Pa or 3 Pa. In one embodiment of step 524a, the step determines if a threshold amount of absolute values of the determined differences are less than the threshold pressure difference.

A second example of a process for determining if the uncalibrated reference-level pressure estimates include any uncalibrated reference-level pressure estimate that should not be used when calibrating the unstable pressure sensor during step 420 is provided in FIG. 5B, which includes the steps of: for each of the periods of time, determining a difference between (i) the uncalibrated reference-level pressure estimate for the period of time and (ii) the calibrated reference-level pressure estimate for the period of time (step 521b); determining a mean or median of the differences (step 522b); determining if a threshold amount of the determined differences are within a threshold pressure difference from the mean or median of the differences (step 523b); if the threshold amount of the determined differences are within the threshold pressure difference from the mean or median of the differences, determining that the uncalibrated reference-level pressure estimates do not include any uncalibrated reference-level pressure estimate that should not be used when calibrating the unstable pressure sensor (step 524b); and if the threshold amount of the determined differences are not within the threshold pressure difference from the mean or median of the differences, determining that the uncalibrated reference-level pressure estimates include an uncalibrated reference-level pressure estimate that should not be used when calibrating the unstable pressure sensor (step 525b).

By way of example, the threshold amount of 523b may be 50% or 80%, and the threshold pressure difference of 523b may be 2 Pa or 3 Pa. In one embodiment of step 523b, the step determines if a threshold amount of absolute values of the determined differences are within the threshold pressure difference from the mean or median.

Identifying at least one uncalibrated reference-level pressure estimate that should not be used when calibrating the unstable pressure sensor (step 440)

Figure 6A:
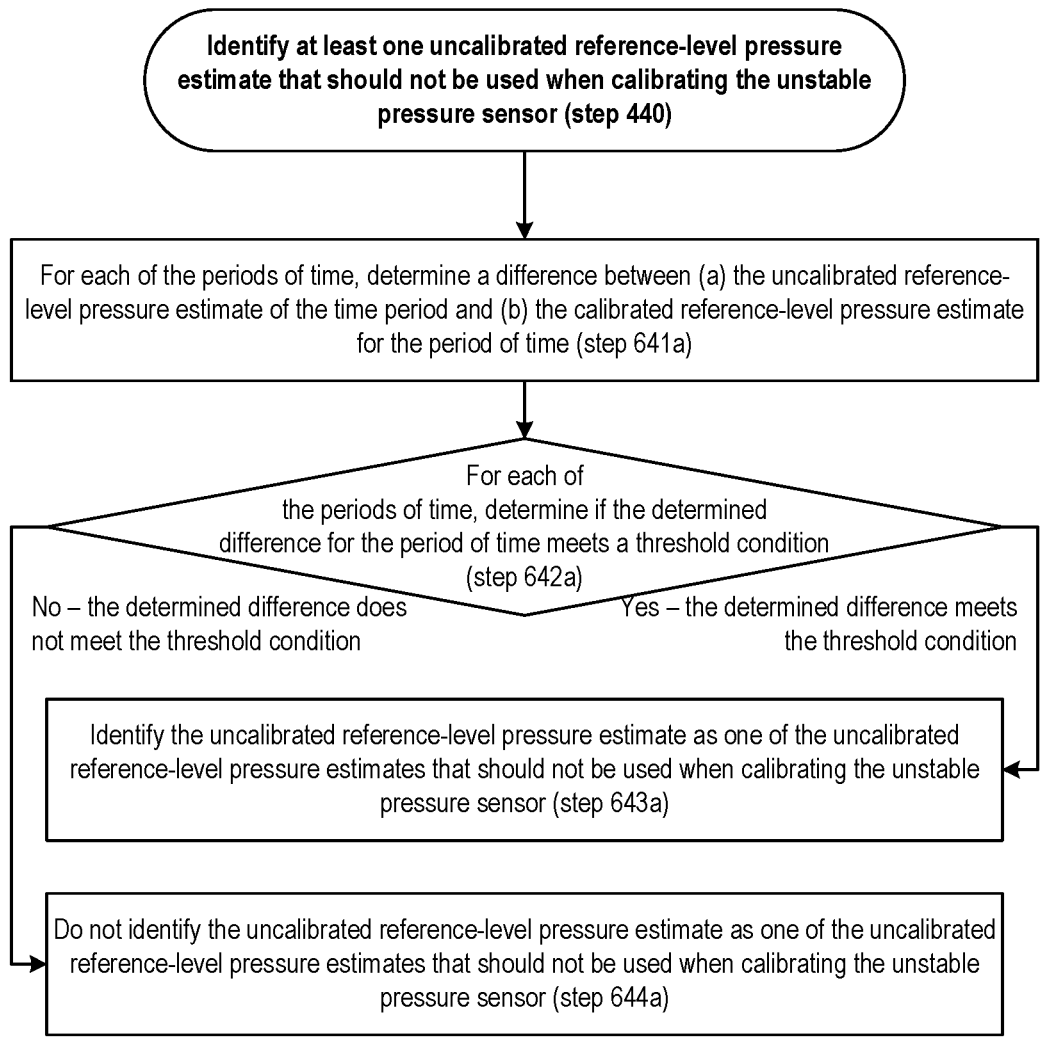
FIG. 6A and FIG. 6B depict different processes for identifying at least one uncalibrated reference-level pressure estimate that should not be used when calibrating the unstable pressure sensor.
Figure 6B:
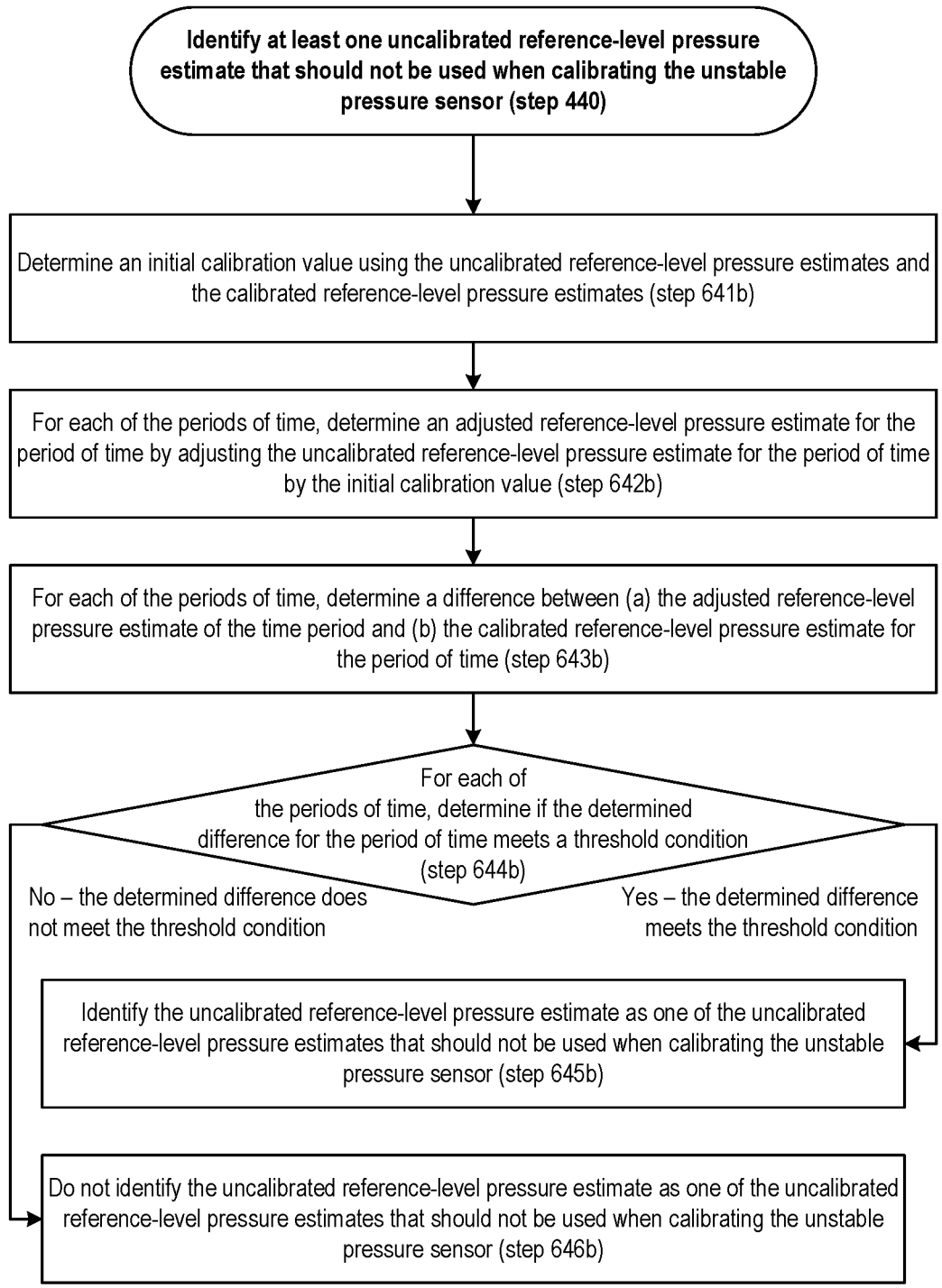

FIG. 6A and FIG. 6B depict different processes for identifying at least one uncalibrated reference-level pressure estimate that should not be used when calibrating the unstable pressure sensor.

A first example of a process for identifying at least one uncalibrated reference-level pressure estimate that should not be used when calibrating the unstable pressure sensor during step 440 is provided in FIG. 6A, which includes the following steps: for each of the periods of time, determining a difference between (a) the uncalibrated reference-level pressure estimate of the time period and (b) the calibrated reference-level pressure estimate for the period of time (step 641a); for each of the periods of time, determining if the determined difference for the period of time meets a threshold condition (step 642a); if the determined difference for the period of time meets the threshold condition, identifying the uncalibrated reference-level pressure estimate as one of the uncalibrated reference-level pressure estimates that should not be used when calibrating the unstable pressure sensor (step 643a); and if the determined difference for the period of time does not meet the threshold condition, not identifying the uncalibrated reference-level pressure estimate as one of the uncalibrated reference-level pressure estimates that should not be used when calibrating the unstable pressure sensor (step 644a). In one embodiment of step 642a, the threshold condition specifies that the determined difference is at least a predefined amount of pressure (e.g., 2 Pa, 3 Pa, 5 Pa, or another amount) more than another difference for a previous or subsequent time period. In another embodiment of step 642a, the threshold condition specifies that the determined difference is at least a predefined amount of pressure (e.g., 2 Pa, 3 Pa, 5 Pa, or another amount) more than a median of other differences for time periods before and/or after the period of time.

A second example of a process for identifying at least one uncalibrated reference-level pressure estimate that should not be used when calibrating the unstable pressure sensor during step 440 is provided in FIG. 6B, which includes the following steps: determining an initial calibration value using the uncalibrated reference-level pressure estimates and the calibrated reference-level pressure estimates (step 641b); for each of the periods of time, determining an adjusted reference-level pressure estimate for the period of time by adjusting the uncalibrated reference-level pressure estimate for the period of time by the initial calibration value (step 642b); for each of the periods of time, determining a difference between (a) the adjusted reference-level pressure estimate of the time period and (b) the calibrated reference-level pressure estimate for the period of time (step 643b); for each of the periods of time, determining if the determined difference for the period of time meets a threshold condition (step 644b); if the determined difference for the period of time meets the threshold condition, identifying the uncalibrated reference-level pressure estimate as one of the uncalibrated reference-level pressure estimates that should not be used when calibrating the unstable pressure sensor (step 645b); and if the determined difference for the period of time does not meet the threshold condition, not identifying the uncalibrated reference-level pressure estimate as one of the uncalibrated reference-level pressure estimates that should not be used when calibrating the unstable pressure sensor (step 646b). In one embodiment of step 644b, the threshold condition specifies that the determined difference is at least a predefined amount of pressure (e.g., 2 Pa, 3 Pa, 5 Pa, or another amount) more than another difference for a previous or subsequent time period. In another embodiment of step 644b, the threshold condition specifies that the determined difference is at least a predefined amount of pressure (e.g., 2 Pa, 3 Pa, 5 Pa, or another amount) more than a median of other differences for time periods before and/or after the period of time.

By way of example, the processes disclosed above may be performed by one or more machines that include: processor(s) or other computing device(s) (e.g., a personal computer or a server) for performing (e.g., that perform, or are configured, adapted or operable to perform) each step; a pressure sensor in a network of pressure sensors for measuring pressure used to determine a reference-level pressure estimate; and data source(s) at which any data identified in the processes is stored for later access during the processes. If there is incidental information, such as a weather report or a technician report, those reports may be stored somewhere on a storage device that can be accessed by the processor or computing device.

Figure 7A:
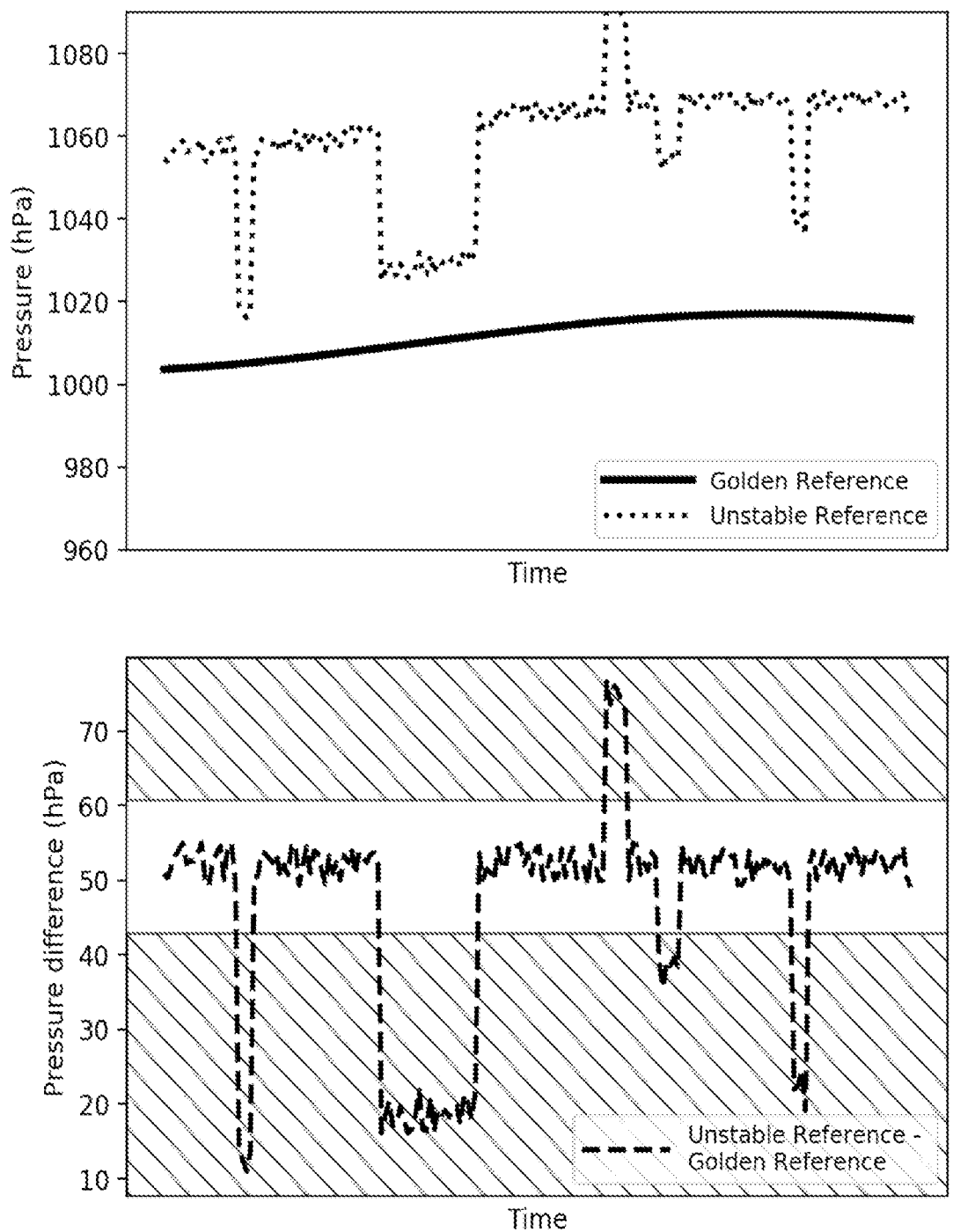
FIG. 7A and FIG. 7B illustrate different processes for identifying at least one uncalibrated reference-level pressure estimate that should not be used when calibrating the unstable pressure sensor.
Figure 7B:
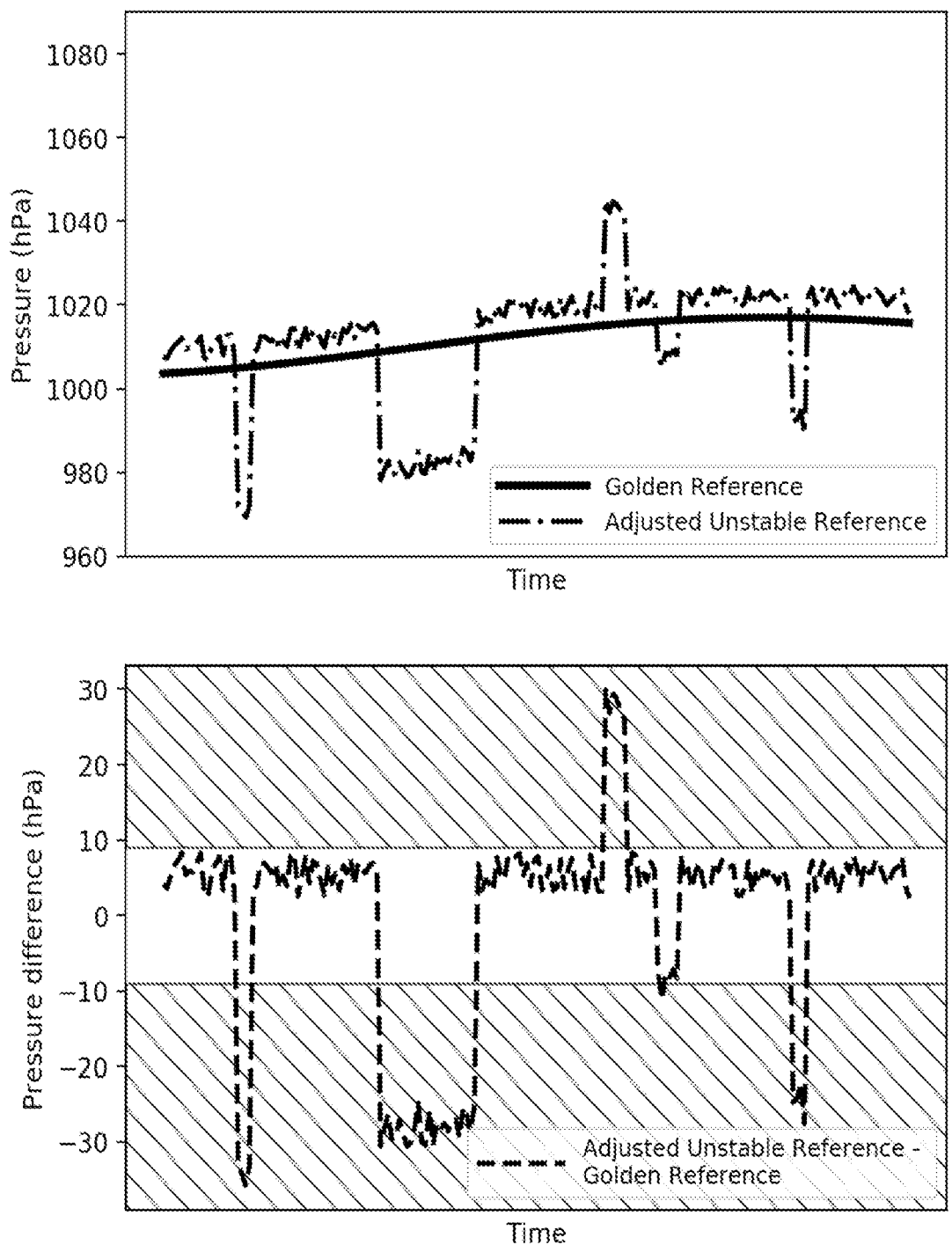

By way of example, FIG. 7A and FIG. 7B respectively illustrate outcomes of the different processes of FIG. 6A and FIG. 6B for identifying at least one uncalibrated reference-level pressure estimate that should not be used when calibrating the unstable pressure sensor, where the excluded pressures are in the hashed portion of the bottom plot, which represent pressures not to use in a calibration.

Technical Benefits

Mobile devices are routinely used to estimate altitudes of users based on (i) reference pressures from a network of reference pressure sensors and (ii) measurements of pressure from pressure sensors of the mobile devices. Unfortunately, limitations in the functionality of the network of reference pressure sensors and the pressure sensor of the mobile device can impact the accuracy of estimated altitudes, which impairs different uses of the estimated altitudes (e.g., emergency response, navigation, calibration, etc.). A common technical problem is drifting of a network's reference pressure sensors and a mobile device's pressure sensors, which requires calibration over time. Processes described herein improve the field of calibration by determining when particular pressure estimates of a pressure sensor should not be used to calibrate the pressure sensor, which increases the accuracy of the calibration compared to other approaches that do not make the same determination. New and useful data is generated, such as data representing when localized anomalies are influencing pressure estimates of an unstable pressure sensor so those pressure estimates can be excluded from consideration when the unstable pressure sensor is calibrated. Functioning of particular devices is therefore improved—e.g., functioning of a pressure sensor that is susceptible to producing previously unusable data, such as pressure data with lower-than-desirable accuracy due to sensor drift, is improved by providing for improved calibration of pressure sensors. For a given environment, a more-reliable pressure sensor network can be maintained that is calibrated based on atmospheric characteristics (e.g., localized anomalies) of that environment that affect calibration results compared to prior approaches that do not consider the atmospheric characteristics. A more-reliable pressure sensor of a mobile device can also be maintained. By improving calibration of pressure sensors, the field of location determination is improved, since calibrated pressure sensors are necessary for accurate estimation of a mobile device's altitude. More accurate estimation of a mobile device's altitude enables quicker emergency response times or improved uses of estimated altitudes. The processes described herein can also be applied to other atmospheric sensors that drift, including temperature sensors.

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 8:
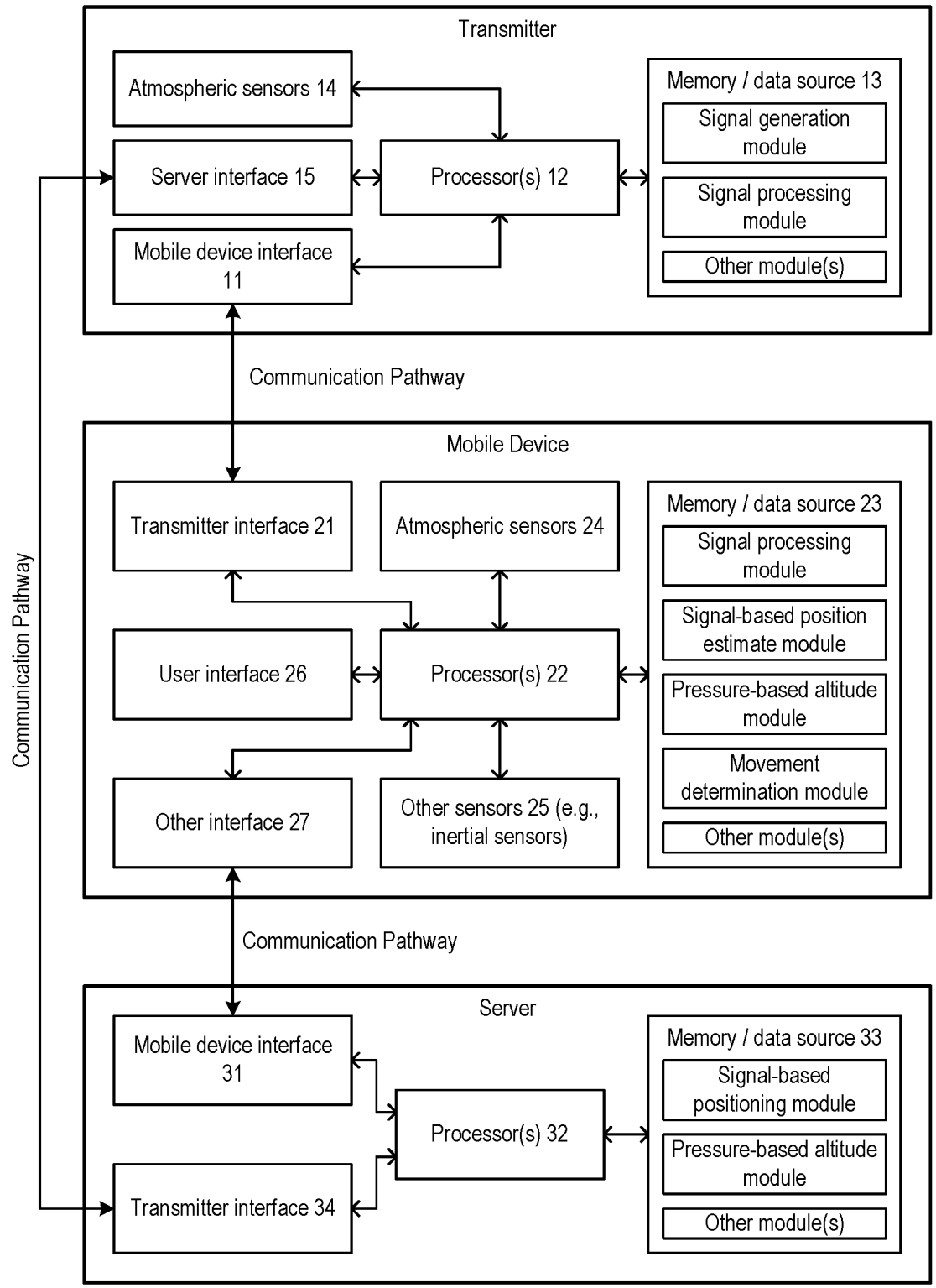
FIG. 8 illustrates components of a transmitter, a mobile device, and a server.

FIG. 8 illustrates components of a transmitter, a mobile device, and a server. Examples of communication pathways are shown by arrows between components.

By way of example in FIG. 8, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

In some embodiments, the atmospheric sensors 14 include an unstable atmospheric sensor. In other embodiments, a stand-alone unstable atmospheric sensor (e.g., a weather station) is substituted for the transmitter, and the stand-alone unstable atmospheric sensor includes: atmospheric sensors (e.g., a pressure sensor for measuring pressures, a temperature sensor for measuring temperatures); memory (e.g., storing instructions for computing reference-level pressures based on the measured pressures); processor(s) for executing instructions stored in the memory; and any suitable interface for communicating pressure data to other things (e.g., the mobile device and/or the server).

By way of example FIG. 8, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 8, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Systems and methods disclosed herein may operate within a network of terrestrial transmitters or satellites. The transmitters may be located at different altitudes or depths that are inside or outside various natural or manmade structures (e.g. buildings). Positioning signals may be sent to the mobile device from the transmitters and/or satellites using known wireless or wired transmission technologies. The transmitters may transmit the signals using one or more common multiplexing parameters—e.g. time slot, pseudorandom sequence, frequency offset, or other. The mobile device may take different forms, including a mobile phone, a tablet, a laptop, a tracking tag, a receiver, or another suitable device that can receive the positioning signals. Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

What is claimed is:

1. A method, comprising:
determining a plurality of uncalibrated reference-level pressure estimates associated with an unstable pressure sensor, each uncalibrated reference-level pressure estimate corresponding to a respective time period of a plurality of time periods, wherein the unstable pressure sensor is an atmospheric sensor which produces measurements of pressure that drift over time;
determining if the plurality of uncalibrated reference-level pressure estimates include an uncalibrated reference-level pressure estimate that should not be used when calibrating the unstable pressure sensor based on a determined difference between two reference pressure estimates for each time period of the plurality of time periods;
identifying the uncalibrated reference-level pressure estimate of the plurality of uncalibrated reference-level pressure estimates that should not be used when calibrating the unstable pressure sensor; and
determining a calibration value for the unstable pressure sensor using the plurality of uncalibrated reference-level pressure estimates except for the identified uncalibrated reference-level pressure estimate that should not be used when calibrating the unstable pressure sensor.

2. The method of claim 1, wherein identifying the uncalibrated reference-level pressure estimate of the plurality of uncalibrated reference-level pressure estimates that should not be used when calibrating the unstable pressure sensor comprises:
determining an initial calibration value using the plurality of uncalibrated reference-level pressure estimates and a plurality of calibrated reference-level pressure estimates, each calibrated reference-level pressure estimate of the plurality of calibrated reference-level pressure estimates corresponding to a respective time period of the plurality of time periods;
for each time period of the plurality of time periods, producing an adjusted reference-level pressure estimate for that time period by adjusting the uncalibrated reference-level pressure estimate for that time period by the initial calibration value;

for each time period of the plurality of time periods,
determining a difference between (i) the adjusted reference-level pressure estimate corresponding to that time period and (ii) the calibrated reference-level pressure estimate corresponding to that time period;
determining if a threshold amount of the determined differences are less than a threshold pressure difference; and
upon determining that the threshold amount of the determined differences are not less than the threshold pressure difference, determining that the uncalibrated reference-level pressure estimate of the plurality of uncalibrated reference-level pressure estimates should not be used when calibrating the unstable pressure sensor.

3. The method of claim 1, wherein determining if the plurality of uncalibrated reference-level pressure estimates include an uncalibrated reference-level pressure estimate that should not be used when calibrating the unstable pressure sensor comprises:
for each time period of the plurality of time periods, determining a difference between (i) an uncalibrated reference-level pressure estimate corresponding to that time period and (ii) a calibrated reference-level pressure estimate corresponding to that time period, wherein the two reference pressure estimates include the uncalibrated reference-level pressure estimate and the calibrated reference-level pressure estimate;
determining a mean or median of the determined differences;
determining if a threshold amount of the determined differences are within a threshold pressure difference from the mean or median of the determined differences; and
upon determining that the threshold amount of the determined differences are not within the threshold pressure difference from the mean or median of the determined differences, determining that the plurality of uncalibrated reference-level pressure estimates include an uncalibrated reference-level pressure estimate that should not be used when calibrating the unstable pressure sensor.

4. The method of claim 1, wherein identifying the uncalibrated reference-level pressure estimate that should not be used when calibrating the unstable pressure sensor comprises:
for each time period of the plurality of time periods, determining a difference between (a) an uncalibrated reference-level pressure estimate corresponding to that time period and (b) a calibrated reference-level pressure estimate corresponding to that time period;
for each time period of the plurality of time periods, determining if the determined difference for that time period meets a threshold condition; and
upon determining that the determined difference for that time period meets the threshold condition, identifying the uncalibrated reference-level pressure estimate as the uncalibrated reference-level pressure estimate that should not be used when calibrating the unstable pressure sensor.

5. The method of claim 1, wherein identifying the uncalibrated reference-level pressure estimate that should not be used when calibrating the unstable pressure sensor comprises:
determining an initial calibration value using the plurality of uncalibrated reference-level pressure estimates and a plurality of calibrated reference-level pressure estimates, the plurality of uncalibrated reference-level pressure estimates and the plurality of calibrated reference-level pressure estimates corresponding to a plurality of respective time periods;
for each time period of the plurality of time periods, determining an adjusted reference-level pressure estimate for that time period by adjusting the uncalibrated reference-level pressure estimate for that time period by the initial calibration value;
for each time period of the plurality of time periods, determining a difference between (a) the adjusted reference-level pressure estimate corresponding to that time period and (b) a calibrated reference-level pressure estimate corresponding to that time period;
for each time period of the plurality of time periods, determining if the determined difference for that time period meets a threshold condition; and
upon determining that the determined difference for that time period meets the threshold condition, identifying the uncalibrated reference-level pressure estimate as the uncalibrated reference-level pressure estimate that should not be used when calibrating the unstable pressure sensor.

6. One or more non-transitory machine-readable media embodying program instructions that, when executed by one or more machines, cause the one or more machines to implement a method, comprising:
determining a plurality of uncalibrated reference-level pressure estimates associated with an unstable pressure sensor, each uncalibrated reference-level pressure estimate corresponding to a respective time period of a plurality of time periods, wherein the unstable pressure sensor is an atmospheric sensor which produces measurements of pressure that drift over time;
determining if the plurality of uncalibrated reference-level pressure estimates include an uncalibrated reference-level pressure estimate that should not be used when calibrating the unstable pressure sensor based on a determined difference between two reference pressure estimates for each time period of the plurality of time periods;
identifying the uncalibrated reference-level pressure estimate of the plurality of uncalibrated reference-level pressure estimates that should not be used when calibrating the unstable pressure sensor; and
determining a calibration value for the unstable pressure sensor using the plurality of uncalibrated reference-level pressure estimates except for the identified uncalibrated reference-level pressure estimate that should not be used when calibrating the unstable pressure sensor.

7. The one or more non-transitory machine-readable media of claim 6, wherein identifying the uncalibrated reference-level pressure estimate of the plurality of uncalibrated reference-level pressure estimates that should not be used when calibrating the unstable pressure sensor comprises:
determining an initial calibration value using the plurality of uncalibrated reference-level pressure estimates and a plurality of calibrated reference-level pressure estimates, each calibrated reference-level pressure estimate of the plurality of calibrated reference-level pressure estimates corresponding to a respective time period of the plurality of time periods;
for each time period of the plurality of time periods, producing an adjusted reference-level pressure estimate for that time period by adjusting the uncalibrated reference-level pressure estimate for that time period by the initial calibration value;

for each time period of the plurality of time periods, determining a difference between (i) the adjusted reference-level pressure estimate corresponding to that time period and (ii) the calibrated reference-level pressure estimate corresponding to that time period;

determining if a threshold amount of the determined differences are less than a threshold pressure difference; and upon determining that the threshold amount of the determined differences are not less than the threshold pressure difference, determining that the uncalibrated reference-level pressure estimate of the plurality of uncalibrated reference-level pressure estimates should not be used when calibrating the unstable pressure sensor.

8. The one or more non-transitory machine-readable media of claim 6, wherein determining if the plurality of uncalibrated reference-level pressure estimates include an uncalibrated reference-level pressure estimate that should not be used when calibrating the unstable pressure sensor comprises:

for each time period of the plurality of time periods, determining a difference between (i) an uncalibrated reference-level pressure estimate corresponding to that time period and (ii) a calibrated reference-level pressure estimate corresponding to that time period, wherein the two reference pressure estimates include the uncalibrated reference-level pressure estimate and the calibrated reference-level pressure estimate;

determining a mean or median of the determined differences;

determining if a threshold amount of the determined differences are within a threshold pressure difference from the mean or median of the determined differences; and upon determining that the threshold amount of the determined differences are not within the threshold pressure difference from the mean or median of the determined differences, determining that the plurality of uncalibrated reference-level pressure estimates include an uncalibrated reference-level pressure estimate that should not be used when calibrating the unstable pressure sensor.

9. The one or more non-transitory machine-readable media of claim 6, wherein identifying the uncalibrated reference-level pressure estimate that should not be used when calibrating the unstable pressure sensor comprises:

for each time period of the plurality of time periods, determining a difference between (a) an uncalibrated reference-level pressure estimate corresponding to that time period and (b) a calibrated reference-level pressure estimate corresponding to that time period;

for each time period of the plurality of time periods, determining if the determined difference for that time period meets a threshold condition; and upon determining that the determined difference for that time period meets the threshold condition, identifying the uncalibrated reference-level pressure estimate as the uncalibrated reference-level pressure estimate that should not be used when calibrating the unstable pressure sensor.

10. The one or more non-transitory machine-readable media of claim 6, wherein identifying the uncalibrated reference-level pressure estimate that should not be used when calibrating the unstable pressure sensor comprises:

determining an initial calibration value using the plurality of uncalibrated reference-level pressure estimates and a plurality of calibrated reference-level pressure estimates, the plurality of uncalibrated reference-level pressure estimates and the plurality of calibrated reference-level pressure estimates corresponding to a plurality of respective time periods;

for each time period of the plurality of time periods, determining an adjusted reference-level pressure estimate for that time period by adjusting the uncalibrated reference-level pressure estimate for that time period by the initial calibration value;

for each time period of the plurality of time periods, determining a difference between (a) the adjusted reference-level pressure estimate corresponding to that time period and (b) a calibrated reference-level pressure estimate corresponding to that time period;

for each time period of the plurality of time periods, determining if the determined difference for that time period meets a threshold condition; and upon determining that the determined difference for that time period meets the threshold condition, identifying the uncalibrated reference-level pressure estimate as the uncalibrated reference-level pressure estimate that should not be used when calibrating the unstable pressure sensor.

11. A system for determining calibration values for atmospheric sensors that provide measured pressures used for estimating altitudes of a mobile device, the system comprising one or more machines configured to perform a method, comprising:

determining a plurality of uncalibrated reference-level pressure estimates associated with an unstable pressure sensor, each uncalibrated reference-level pressure estimate corresponding to a respective time period of a plurality of time periods, wherein the unstable pressure sensor is an atmospheric sensor which produces measurements of pressure that drift over time;

determining if the plurality of uncalibrated reference-level pressure estimates include an uncalibrated reference-level pressure estimate that should not be used when calibrating the unstable pressure sensor based on a determined difference between two reference pressure estimates for each time period of the plurality of time periods;

identifying the uncalibrated reference-level pressure estimate of the plurality of uncalibrated reference-level pressure estimates that should not be used when calibrating the unstable pressure sensor; and determining a calibration value for the unstable pressure sensor using the plurality of uncalibrated reference-level pressure estimates except for the identified uncalibrated reference-level pressure estimate that should not be used when calibrating the unstable pressure sensor.

12. The system of claim 11, wherein identifying the uncalibrated reference-level pressure estimate of the plurality of uncalibrated reference-level pressure estimates that should not be used when calibrating the unstable pressure sensor comprises:

determining an initial calibration value using the plurality of uncalibrated reference-level pressure estimates and a plurality of calibrated reference-level pressure estimates, each calibrated reference-level pressure estimate of the plurality of calibrated reference-level pressure estimates corresponding to a respective time period of the plurality of time periods;

for each time period of the plurality of time periods, producing an adjusted reference-level pressure estimate for that time period by adjusting the uncalibrated reference-level pressure estimate for that time period by the initial calibration value;

for each time period of the plurality of time periods, determining a difference between (i) the adjusted reference-level pressure estimate corresponding to that time period and (ii) the calibrated reference-level pressure estimate corresponding to that time period;

determining if a threshold amount of the determined differences are less than a threshold pressure difference; and upon determining that the threshold amount of the determined differences are not less than the threshold pressure difference, determining that the uncalibrated reference-level pressure estimate of the plurality of uncalibrated reference-level pressure estimates should not be used when calibrating the unstable pressure sensor.

13. The system of claim 11, wherein determining if the plurality of uncalibrated reference-level pressure estimates include an uncalibrated reference-level pressure estimate that should not be used when calibrating the unstable pressure sensor comprises:

for each time period of the plurality of time periods, determining a difference between (i) an uncalibrated reference-level pressure estimate corresponding to that time period and (ii) a calibrated reference-level pressure estimate corresponding to that time period, wherein the two reference pressure estimates include the uncalibrated reference-level pressure estimate and the calibrated reference-level pressure estimate;

determining a mean or median of the determined differences;

determining if a threshold amount of the determined differences are within a threshold pressure difference from the mean or median of the determined differences; and upon determining that the threshold amount of the determined differences are not within the threshold pressure difference from the mean or median of the determined differences, determining that the plurality of uncalibrated reference-level pressure estimates include an uncalibrated reference-level pressure estimate that should not be used when calibrating the unstable pressure sensor.

14. The system of claim 11, wherein identifying the uncalibrated reference-level pressure estimate that should not be used when calibrating the unstable pressure sensor comprises:

for each time period of the plurality of time periods, determining a difference between (a) an uncalibrated reference-level pressure estimate corresponding to that time period and (b) a calibrated reference-level pressure estimate corresponding to that time period;

for each time period of the plurality of time periods, determining if the determined difference for that time period meets a threshold condition; and upon determining that the determined difference for that time period meets the threshold condition, identifying the uncalibrated reference-level pressure estimate as the uncalibrated reference-level pressure estimate that should not be used when calibrating the unstable pressure sensor.

15. The system of claim 11, wherein identifying the uncalibrated reference-level pressure estimate that should not be used when calibrating the unstable pressure sensor comprises:

determining an initial calibration value using the plurality of uncalibrated reference-level pressure estimates and a plurality of calibrated reference-level pressure estimates, the plurality of uncalibrated reference-level pressure estimates and the plurality of calibrated reference-level pressure estimates corresponding to a plurality of respective time periods;

for each time period of the plurality of time periods, determining an adjusted reference-level pressure estimate for that time period by adjusting the uncalibrated reference-level pressure estimate for that time period by the initial calibration value;

for each time period of the plurality of time periods, determining a difference between (a) the adjusted reference-level pressure estimate corresponding to that time period and (b) a calibrated reference-level pressure estimate corresponding to that time period;

for each time period of the plurality of time periods, determining if the determined difference for that time period meets a threshold condition; and upon determining that the determined difference for that time period meets the threshold condition, identifying the uncalibrated reference-level pressure estimate as the uncalibrated reference-level pressure estimate that should not be used when calibrating the unstable pressure sensor.

* * * * *